United States Patent Office 3,001,294
Patented Sept. 26, 1961

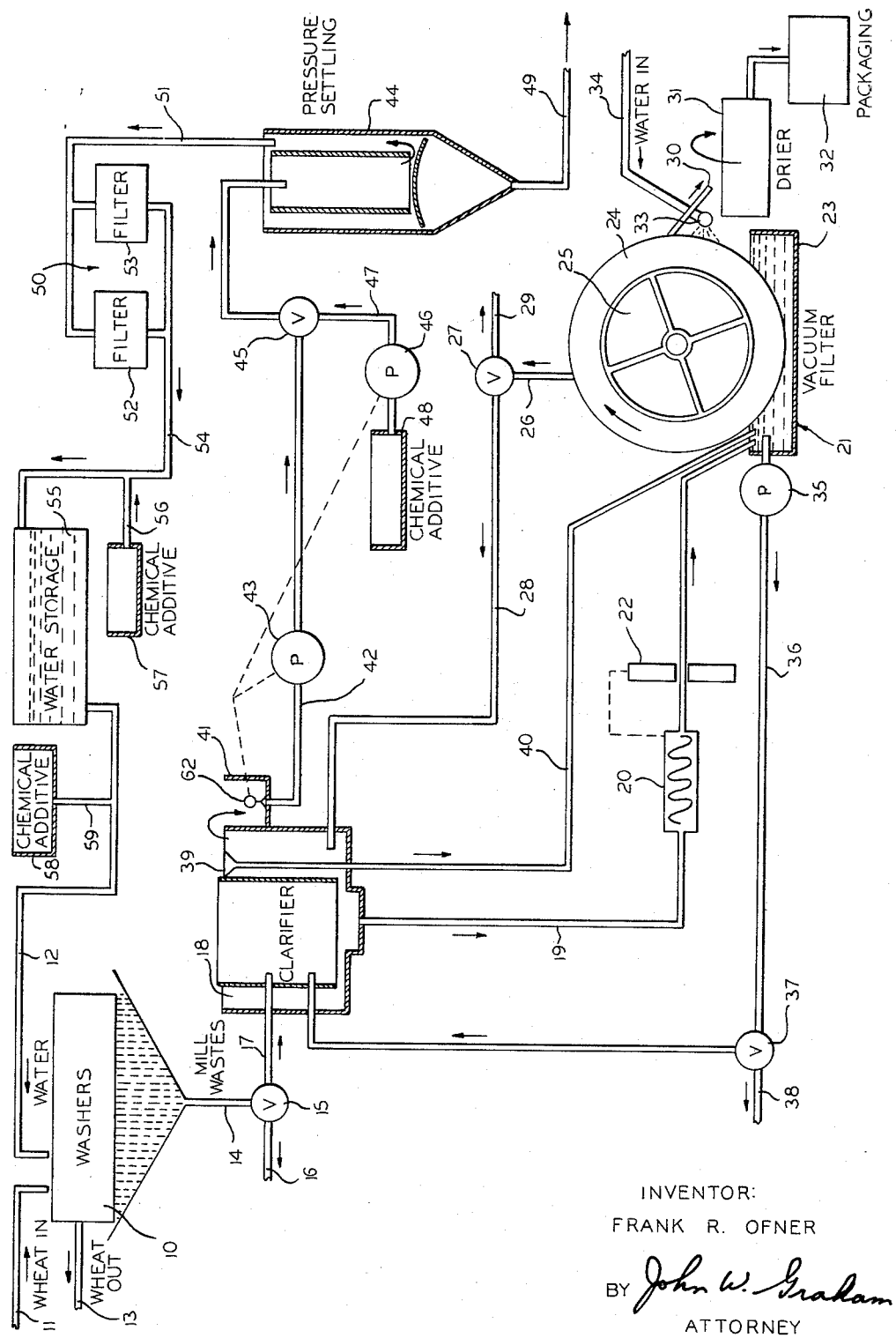

3,001,294
APPARATUS FOR THE RECOVERY OF SOLIDS AND LIQUID FROM FLOUR MILL WASTES
Frank R. Ofner, Portland, Oreg., assignor to Industrial Processes, Inc., Portland, Oreg., a corporation of Washington
Filed May 26, 1958, Ser. No. 737,727
7 Claims. (Cl. 34—56)

This invention relates to a system and apparatus for separating the solids and liquid of an admixture thereof, and more particularly to a system and apparatus for recovering food solids and the liquid carrier therefor which may comprise wastes in food processing plants.

This application is a continuation-in-part of my co-pending patent applications, Serial No. 325,773, filed December 13, 1952, now Patent No. 2,835,985; and Serial No. 382,806, filed September 28, 1953, now Patent No. 2,835,984.

The invention has particular utility in connection with the recovery of solids and wash water that are ordinarily the waste products of flour mills, but may be used in other environments which are analogous thereto. However, recovery of flour mill wastes will be considered in particular because of the difficult problems that arise in the recovery thereof.

In a large percentage of flour mills, the wheat used in preparing flour is cleaned by a washing process prior to its being milled. In such washing process, the wheat is subjected to a water bath, and inadvertently a large quantity of broken, cracked and whole wheat is carried away with the waste wash water. Since a minimum amount of water is used in the washing process as an economy measure, a relatively large concentration of wheat solids is present in the wastes.

Generally, the washing of the wheat grain takes place prior to the hulling of the grain, and the whole grain with the hulls thereon is dumped into a water stream and carried thereby into a centrifugal separator that ordinarily consists of a rotating hollow cylinder having a plurality of apertures along the outer surface through which the broken and cracked grain as well as some of the hulls are carried. The grain products that will later be hulled and milled into flour are moved onwardly through the center of the rotating cylinder by a spiral ribbon. The waste solids that are forced through the apertures in the rotating cylinder may be characterized as being water-borne, i.e., are suspended in a water solution and, for example, may have at this point a paste-like consistency.

These waste solids have heretofore been disposed of as valueless, and have been carried away from the centrifugal separator after being discharged therefrom, by a stream of water that usually empties into a waste disposal system. The waste solids are, however, high in food value since (excluding the actual wheat seed itself) they include the wheat heart which contains about 22% protein and 8% fat, and the hulls which are about 12% protein and 3½% fat.

Because of the food value in these flour mill waste solids, prior attempts have been made to recover these products as an animal nutrient or feed. The attempts have been fruitless because the recovery could not be accomplished economically and, while the wastes are high in protein and fat, the recovered products had a very low protein and fat content and therefore had little utility as a nutrient.

It is only economically feasible to carry the flour mill waste solids from the centrifugal separator by means of a water stream. Thus, the wastes to be recovered must be separated from a rather large amount of water, and the water separation can occur practicably only in a thickener such as a centrifuge or clarifier or settling tank of some type. However, wheat is rich in both starch and gluten, and the gluten as is well known is a proteid or sticky albumin. Upon sitting for prolonged periods, the proteids or proteins and starches are dissipated from the wheat by what is believed to be a leaching action, and appear in the water as a thick gelatin or pasty mass. When this occurs and the wastes are introduced into a clarifier, the thick paste or gelatin clogs the filters and pumps, and generally impedes the settling action of the clarifier. It is, therefore, virtually impossible to separate the fluids from the solids in the clarifier, and certainly any separation that occurs is not efficient and therefore not economical. Moreover, since the fats and proteins have been dissipated from the wheat solids, the recovered products are of practically no value as a nutrient, and are not advantageously usable as an animal feed.

Further, in mills that clean the wheat by a washing process, water is used in large quantities for in efficient operation of the washers about three to five gallons of water are required for each bushel of wheat. In many areas, water in such quantities is inaccessible, and today it is becoming increasingly inaccessible even in areas where it was once plentiful. Thus, this imposes a burden on millers because the water costs are initially high; and because the water cannot be reused, the consumption is tremendous and consequently so are the costs.

In accord with this same problem is that of disposing of the wastes—namely, the large quantities of water and the wheat solids contained therein. At one time, this was simply a problem met by the individual millers and was usually solved by discharging the wastes into open streams and rivers. Today, governmental regulation limits and most frequently prevents disposal of the wastes in this manner. As a result, the sewage disposal systems of the various municipalities must be employed; and for this use surcharges are imposed on the millers. These charges are quite high for a number of reasons: First, simply because of the large volume of material that must be processed; secondly, because of the relatively high concentration of solids in the fluid material; and thirdly, because the material is essentially of organic character which increases the sanitation problem.

It will be apparent from what has been said that a system which will conserve the water used by millers and therefore lower their water costs, will be an advantageous advance in the industry; and the provision of such system is one of the objects of this invention. Another object of the invention is in the provision of a system for recovering both the waste solids and wash water that comprises flour mill wastes, whereby the recovered solids may be sold as a valuable by-product and the water which is recovered reused in subsequent washing processes.

Yet another object is that of providing a system and apparatus for recovering flour mill wastes, and which is effective to the extent that upwardly of 95% of the waste solids are recovered and upwardly of 90% of the wash water is recovered for reuse. A further object is to provide a system of the character described which has an extremely low initial cost relative to the savings realized by a reduction in the water costs and sewage surcharges otherwise paid by millers; and when viewed also in light of the profits made from sale of the recovered wheat solids, the cost of the system and equipment is negligible.

Yet a further object is in the provision of a system of the character described which operates automatically with but a minimum of attention from personnel, and in which the maintenance costs are minimal. Additional objects and advantages of the invention will become apparent as the specification develops.

An embodiment of the invention is illustrated in the accompanying drawing, in which the single figure thereof is a diagrammatic view of a system embodying the same.

In the drawing, the washers are indicated diagrammatically at 10, and wheat is fed into the washers as indicated by the conduit 11. Water for washing the wheat is fed to the washers through the conduit 12. The washers may be wholly conventional and, as is well known, the washed wheat is discharged therefrom as through a conduit 13. However, a portion of the wheat fed into the washers through the conduit 11 is carried away by the wash water, and comprises mostly broken and cracked wheat grains as well as hulls and some whole wheat kernels. This material constituting the solids and wash water may be characterized as mill wastes, and is taken from the washers 10 through a conduit 14 having a valve 15 interposed therein.

The valve 15 connects with a conduit 16 that leads to the sewage disposal system, and connects also with a conduit 17 that feeds into a clarifier or other settling device 18. The valve 15 can be adjusted to feed the wastes either to the clarifier 18 or, when necessary, directly to the sewage disposal system through the conduit 16. The clarifier 18 may be conventional, and functions to permit the solids contained in the wastes to settle out of the liquid. Preferably then, the volume of the clarifier 18 is so related to the flow of material thereinto that the liquid body contained within the clarifier remains relatively quiet to assure an efficient settling action.

The mill wastes should be fed into the clarifier within about 16 hours after their formation, and ordinarily will be delivered to the clarifier almost immediately after the formation thereof because the washers 10 will be in continuous use, and therefore the material discharged therefrom must be removed immediately. Up to about 98% of the solids contained within the mill wastes settle out of the liquid within a period of about 15 minutes after the material has been fed into the clarifier 18. In any event, it ordinarily is preferable to remove the precipitated solids from the clarifier 18 within about two hours after the mill wastes enter the clarifier. The reason for this is that the fats and proteins in the wheat solids are dissipated quite rapidly, and if such dissipation progresses to any great extent the recovered solids are not suitable for use as an animal nutrient. Further, the proteins and starches when dissipated into the liquid appear as a thick gelatin or pasty mass, thereby destroying the function of the clarifier and ruining the effectiveness of the subsequent apparatus. It will be apparent that the detention time within the clarifier 18 will be related to the time lapse between the formation of the mill wastes, and the delivery thereof to the clarifier. Thus, if the wastes are delivered to the clarifier immediately after their formation, they can be retained within the clarifier for a much longer period than if they are stored for a substantial time interval before the delivery thereof.

The concentrated solids are taken from the clarifier 18 through a conduit 19 by means of a sludge or screw pump 20 that then delivers the solids to a filter 21. At this time, the solids will have a moisture content of about 60% to 75%.

The pump 20 is controlled by a sensing device 22 which may take the form of one of the commercially available electric eye sensing devices operative to measure the quantity of material being delivered by the pump. The sensing control is arranged with the pump so that the pump is actuated thereby once every half hour, and thereafter the pump is permitted to remain in operation for a period of about 90 seconds. If, during this 90-second interval, the pump 20 is delivering material at a rate less than a predetermined quantity, the sensing control 22 terminates operation of the pump. Assuming the same condition, this operational sequence will be repeated cyclically at one-half hour intervals. On the other hand, if during the 90-second interval, the pump 20 is delivering material at a rate in excess of the aforementioned predetermined quantity, as measured by the sensing control 22, then the pump is maintained in operative condition until the flow or quantity again falls below the predetermined value. This control is provided in order to assure a steady or regular delivery of material to the vacuum filter whenever the pump 20 is in operation, in contrast to an intermittent type of feed in which slugs of material would be delivered to the filter—such slugs being in no way related to the operational characteristics and capacity of the pump.

The vacuum filter 21 may be largely conventional, and comprises a pan 23 into which the concentrated solids are delivered by the pump 20. A rotary drum 24 is supported so that the cylindrical surface thereof passes through the pan 23 as the drum rotates. The cylindrical surface contains the usual filter cloth, and a vacuum is created within the interior 25 of the drum. Thus, as the drum rotates, material is drawn to the filter cloth surface thereof by reduced pressure within the interior of the drum; and as a consequence, moisture is withdrawn from the material and is sucked into the interior of the drum, and is discharged through a conduit 26, valve 27 and conduit 28 which returns the same to the clarifier 18. However, a conduit 29 also connects with the valve 27, and when necessary the liquid can be delivered through the conduit 29 directly to the sewage disposal system. If desired, the conduit 28 may be connected to water recirculation systems at another location, as will be mentioned again hereinafter.

The solid material clinging to the surface of the drum 24 is removed therefrom, as by means of a scraper 30 which then delivers the partially dried solids to a drier 31 which may be of the rotary kiln type. From the drier, the materials are delivered to the subsequent processing stations, such as a packaging station 32. It will be noted that a manifold 33 extends along the longitudinal axis of the drum 24 adjacent the cylindrical surface thereof, and at a location below the scraper 30. This manifold is supplied with water under pressure through a conduit 34. The manifold is equipped with spray nozzles directed toward the surface of the drum, and serves to wash or flush the same to prevent clogging of the relatively small openings therein.

The liquid body within the vacuum pan 23 is maintained by a pump 35 which may be controlled by a float or other suitable device for measuring the quantity of material within the pan. The pump is interposed in a conduit 36 which extends between the pan and the clarifier 18. Thus, if the liquid level within the pan 23 tends to rise above a fixed or preselected amount, the pump 35 is placed in operation to return a portion of the material to the clarifier. The conduit 36 may have a valve 37 interposed therein which connects also to a conduit 38 leading directly to the sewage disposal system. When necessary then, the material otherwise returned to the clarifier may be directed into the disposal system.

It is apparent that the clarifier 18 is equipped with a skimming device 39 connected by a conduit 40 with the filter pan 23. Thus, any solids which tend to collect along the surface of the body of the material within the clarifier 18 are collected and are fed to the filter. The water effluent in the clarifier spills over a weir and into a collection basin 41 in open communication at its lower end with a flow conduit 42 having a pump 43 interposed therein. The conduit 42 leads to a pressure settling tank 44 through a valve 45. A chemical additive is delivered to the settling tank 44 by a pump 46 connected by a conduit 47 with a storage container 48, provided for the additive. The additive is a floccing agent, preferably a mixture of alum and sulfuric acid. The floccing agent is effective to remove the colloidal material from the effluent within the settling tank 44.

The floccing agent in one specific composition may comprise 20 pounds of alum, two gallons of sulfuric acid (commercial grade), and 40 gallons of water.

The concentrated colloidal materials are withdrawn from the tank 44 through a conduit 49, and may be discharged into the sewage disposal system. The water is delivered from the tank 44 to a filter 50 through a conduit 51. In the specific illustration, the filter 50 comprises a pair of filter units 52 and 53, connected in parallel and which on the discharge side thereof are connected by a conduit 54 to a water storage tank 55. Also feeding into the storage tank 55 through a conduit 56 is a chemical additive storge tank 57. The chemical contained within the tank 57 may be soda ash. It will be noted that a further chemical additive may be supplied to the water after it leaves the storage tank 55 from a tank 58 connecting with the inlet conduit 12 through a branch conduit 59. Preferably, the chemical additive contained within the tank 58 will be chlorine.

The filters 52 and 53 are pressure sand filters, and are effective to remove the floccing material from the water which was added thereto, for the purpose of removing the colloidal material from the water when in the settling tank 44. The filters may contain a flushing system or backwash system to permit periodic cleaning thereof. Preferably, a relatively uniform flow of water is provided to the filters 52 and 53 so as not to stir up the floc bed thereon, which would occur if the flow rate were intermittent. Such a flow may be provided through a valve control system that determines the operating period for the water supply pump 43 and chemical additive pump 46. Such a system is illustrated diagrammatically in connection with the conduit 42 and overflow basin 41, and is denoted with the numeral 60. The dotted lines interconnecting the valve 60 and pumps 43 and 46 indicate that the operation of the pumps is dependent upon and controlled by the valve.

In general practice, approximately 5% of the water will be either absorbed by the wheat or screens or lost in the filtrate or through evaporation. When the wheat washed has a smut condition, approximately 5% additional water will be wasted or discharged through the sewage disposal system in order to provide better odor and color control of the water. The net result produced by the reuse of the water will satisfy about 90% of the water requirements of the wheat washer. In a mill having a capacity of about 18,000 bushels per day, this will easily exceed a savings of about $7,000.00 per year. Further, it will substantially eliminate the sewage surcharges which often are in excess of $300.00 per month in an average size mill. When such cost savings are added to the profit realized by the miller in the recovery and sale of the wheat solids as an animal nutrient, in the exemplary mill referred to before, the yearly savings will exceed some $33,000.00 per year. This, of course, is appreciable and it makes apparent the advantageous character of the recovery system.

While in the foregoing specification an embodiment of the invention has been described in considerable detail for purposes of making an adequate disclosure thereof, it will be apparent to those skilled in the art that numerous changes may be made therein without departing from the spirit and principles of the invention.

I claim:

1. In a system for recovering raw wheat solids from the washer wastes of a flour mill, a wheat washer from which wastes comprising wheat solids and water are discharged, a thickener connected with said washer for receiving such discharge therefrom and being operative to concentrate the wheat solids, a filter connected with said thickener for receiving such concentrated wheat solids therefrom and being operative to remove moisture from the concentrated wheat solids, feed structure interposed between said thickener and filter for controlling the movement of such concentrated wheat solids to the filter, sensing apparatus responsive to the movement of such concentrated wheat solids to said filter for measuring the volume of the solids flow and being connected with said feed structure for controlling the same in accordance with such flow to provide a relatively uniform movement of solids to said filter during selected flow periods, pump control apparatus responsive to the quantity of material in said filter and being connected between said filter and thickener for returning material to the latter to maintain the volume of material in said filter below a predetermined quantity, and a drier connected with said filter for receiving wheat solids therefrom to further reduce the moisture content thereof.

2. The system of claim 1 in which said thickener comprises a clarifier, and in which a skimming device is provided in said clarifier and is connected with said filter for delivering thereto material skimmed from the surface of the washer wastes contained within said clarifier.

3. The system of claim 1 in which said filter is a vacuum filter, and in which the water removed thereby from the concentrated wheat solids is returned to said thickener.

4. The system of claim 1 in which flow conduit structure is provided for recycling to said washer at least a portion of the water separated in said thickener during the concentration of such wheat solids.

5. The system of claim 4 in which filter means are provided in said flow conduit structure for filtering the water recycled to said washer.

6. The system of claim 1 in which said sensing apparatus is disposed on the filter side of said feed structure and is effective to terminate operation thereof when the volume of solids being fed to said filter falls below a predetermined value and is effective to periodically initiate operation of said feed structure thereafter for a predetermined interval to measure during such intervals the volume of the solids flow to said filter.

7. In a system for separating and recovering solids from an admixture thereof with a liquid, a thickener for receiving such admixture and being operative to concentrate the solids therein, a filter connected with said thickener for receiving such concentrated solids therefrom and being operative to remove moisture from the concentrated solids, feed structure interposed between said thickener and filter for controlling the movement of such concentrated solids to the filter, sensing apparatus responsive to the movement of such concentrated solids to said filter for measuring the volume of the solids flow and being connected with said feed structure for controlling the same in accordance with such flow to provide a relatively uniform movement of solids to said filter during selected flow periods, pump control apparatus responsive to the quantity of material in said filter and being connected between said filter and thickener for returning material to the latter to maintain the volume of material in said filter below a predetermined quantity, and conveyance structure for removing the solids from said filter.

References Cited in the file of this patent

UNITED STATES PATENTS

| | | |
|---|---|---|
| 345,703 | Lafferty | July 20, 1886 |
| 1,916,417 | Coulson | July 4, 1933 |
| 1,957,898 | Mitchell | May 8, 1934 |
| 2,070,286 | Lissauer et al. | Feb. 9, 1937 |
| 2,246,224 | Streander | June 17, 1941 |
| 2,299,529 | Crampton | Oct. 20, 1942 |